US008056967B2

(12) United States Patent
Fukui et al.

(10) Patent No.: US 8,056,967 B2
(45) Date of Patent: Nov. 15, 2011

(54) CEILING DECORATIVE PANEL

(75) Inventors: Kazuo Fukui, Kariya (JP); Jun Isami, Kariya (JP); Toshimitsu Matsuoka, Kariya (JP); Kenji Atarashi, Nagoya (JP)

(73) Assignees: Toyota Shatai Kabushiki Kaisha, Kariya-shi (JP); Toyota Boshoku Kabushiki Kaisha, Kariya-shi (JP); Hayashi Telempu Co., Ltd., Nagoya-shi (JP)

( * ) Notice: Subject to any disclaimer, the term of this patent is extended or adjusted under 35 U.S.C. 154(b) by 0 days.

(21) Appl. No.: 12/416,514

(22) Filed: Apr. 1, 2009

(65) Prior Publication Data

US 2009/0261624 A1    Oct. 22, 2009

(30) Foreign Application Priority Data

Apr. 22, 2008 (JP) ................... 2008-111634

(51) Int. Cl.
 B60R 13/02    (2006.01)
(52) U.S. Cl. ..................................... 296/214
(58) Field of Classification Search .................. 296/214, 296/210, 211, 191, 39.1, 39.3; 362/490
See application file for complete search history.

(56) References Cited

U.S. PATENT DOCUMENTS

| 2,116,750 | A | * | 5/1938 | Dashner | 362/490 |
|---|---|---|---|---|---|
| 4,628,417 | A | * | 12/1986 | Kaminski et al. | 362/485 |
| D343,915 | S | * | 2/1994 | Baader et al. | D26/28 |
| 5,357,408 | A | * | 10/1994 | Lecznar et al. | 362/490 |
| 5,465,200 | A | * | 11/1995 | Finocchio et al. | 362/368 |
| 5,688,022 | A | * | 11/1997 | Adams et al. | 296/214 |
| 2002/0195844 | A1 | * | 12/2002 | Hipwell | 296/214 |
| 2005/0168015 | A1 | * | 8/2005 | Davey et al. | 296/214 |
| 2006/0061128 | A1 | * | 3/2006 | Hall | 296/97.9 |

FOREIGN PATENT DOCUMENTS

JP    5-131882    5/1993

OTHER PUBLICATIONS

Chinese Office Action issued Dec. 27, 2010, in Patent Application No. 200910130225.8 (with English-language translation).

* cited by examiner

Primary Examiner — Glenn Dayoan
Assistant Examiner — Sunsurraye Westbrook
(74) Attorney, Agent, or Firm — Oblon, Spivak, McClelland, Maier & Neustadt, L.L.P.

(57) ABSTRACT

There is provided a ceiling decorative panel that can be carried easily and reliably even if a dome lamp is disposed in an opening portion. The ceiling decorative panel of the present invention is disposed on an inside of a roof panel of a vehicle body. The ceiling decorative panel includes a recessed portion protruding toward a back face side of the ceiling decorative panel and having the opening portion at a bottom face. The recessed portion retains the dome lamp in itself. A grip that can be raised in a direction same as a protruding direction of the recessed portion so as to be gripped is disposed to be adjacent to the opening portion.

8 Claims, 8 Drawing Sheets

CEILING DECORATIVE PANEL

CROSS-REFERENCES TO RELATED APPLICATIONS

The present application claims priority under 35 U.S.C. §119 to Japanese Application No. 2008-111634, filed Apr. 22, 2008, entitled "CEILING DECORATIVE PANEL". The contents of this application are incorporated herein by reference in their entirety.

BACKGROUND OF THE INVENTION

1. Field of the Invention

The present invention relates to a ceiling decorative panel to be provided to an inside of a roof panel of a vehicle body.

2. Description of the Related Art

There is a conventionally known ceiling decorative panel to be provided to an inside of a roof panel of a vehicle body (see JP 1993-131882 Unexamined Patent Publication (Kokai), for example).

As shown in FIG. 8, the ceiling decorative panel 9 has, at its middle portion, a recessed portion 91 protruding toward a back face 912 side of the ceiling decorative panel 9 and having an opening portion 911 in a bottom face 910.

The recessed portion 91 is formed to retain a dome lamp 921 on the inside. In a longitudinal front portion of the ceiling decorative panel 9, a map lamp opening portion 913 is formed. In the map lamp opening portion 913, a map lamp 922 is disposed (see an arrow Y in FIG. 8).

Conventionally, a worker carries the ceiling decorative panel 9 to a line side of an assembly line by inserting his/her hands into the opening portion 911 (hereafter referred to as a dome lamp opening portion 911 for convenience of explanation) for disposing the dome lamp 921, as well as into the map lamp opening portion 913, and gripping end edges 914, 915 of the respective openings.

However, in recent years, the ceiling portion is getting modularized and it is now often the case that the dome lamp 921 is mounted in advance into the dome lamp opening portion 911 on a sub-line (see an arrow X in FIG. 8). In this method, however, the dome lamp opening portion 911 is closed and it is impossible to insert a hand into the dome lamp opening portion 911. Therefore, a worker cannot grip the end edge 914 to carry the ceiling decorative panel 9 to the line side of the assembly line.

If the worker tries to hold end edges 8 in a width direction of the ceiling decorative panel 9 to carry the panel 9, the ceiling decorative panel 9 may bend at its relatively low-strength middle portion.

SUMMARY OF THE INVENTION

The present invention has been accomplished in view of the above prior-art problem and an object of the present invention is to provide a ceiling decorative panel in which a grip can be secured easily and which can be carried stably even if a dome lamp has been mounted in advance into an opening portion.

According to an aspect of the invention, there is provided a ceiling decorative panel to be provided to an inside of a roof panel of a vehicle body, the ceiling decorative panel comprising:

a recessed portion that protrudes toward a back face side of the ceiling decorative panel and has an opening portion at a bottom face, the recessed portion configured to retain a dome lamp in itself, and a grip disposed to be adjacent to the opening portion, the grip configured to be raised in a direction same as a protruding direction of the recessed portion.

Operation and effects of the present invention will be described.

In the ceiling decorative panel, the grip that can be raised in the direction same as the protruding direction of the recessed portion so as to be gripped is disposed to be adjacent to the opening portion. To carry the ceiling decorative panel, the grip is raised in the direction same as the protruding direction of the recessed portion. In this way, a worker can grip the grip with one of his/her hands. By gripping longitudinal one end edge of the ceiling decorative panel and the grip, or an end edge of an opening portion and the grip when the opening portion is formed besides the above opening in the ceiling decorative panel, with his/her left and right hands, respectively, he/she can lift the ceiling decorative panel.

In other words, with the above structure, it is possible to stably carry the ceiling decorative panel even if the dome lamp has been mounted in advance into the opening portion and the opening portion is closed.

As described above, according to the present invention, it is possible to provide the ceiling decorative panel in which the grip can be secured easily and which can be carried stably even if the dome lamp has been mounted in advance into the opening portion.

DETAILED DESCRIPTION OF PREFERRED EMBODIMENTS

In the above aspect, the grip is formed by notching the bottom face from the opening portion.

In this case, it is possible to easily form the grip with a simple structure.

An embodiment according to a ceiling decorative panel of the present invention will be described by using FIGS. 1 to 7.

Figure 4:
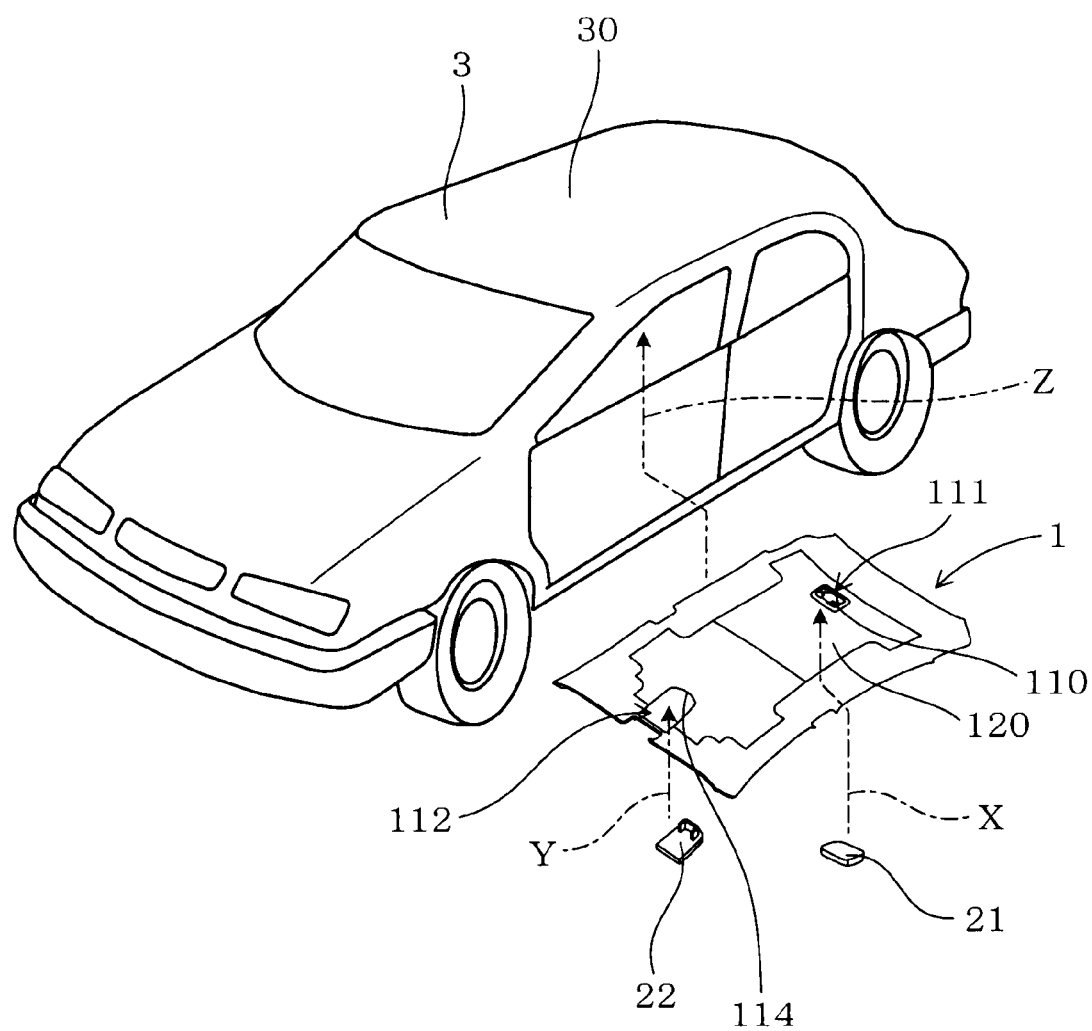
FIG. 4 is a perspective view of a vehicle body and the ceiling decorative panel in the embodiment.
Figure 5:
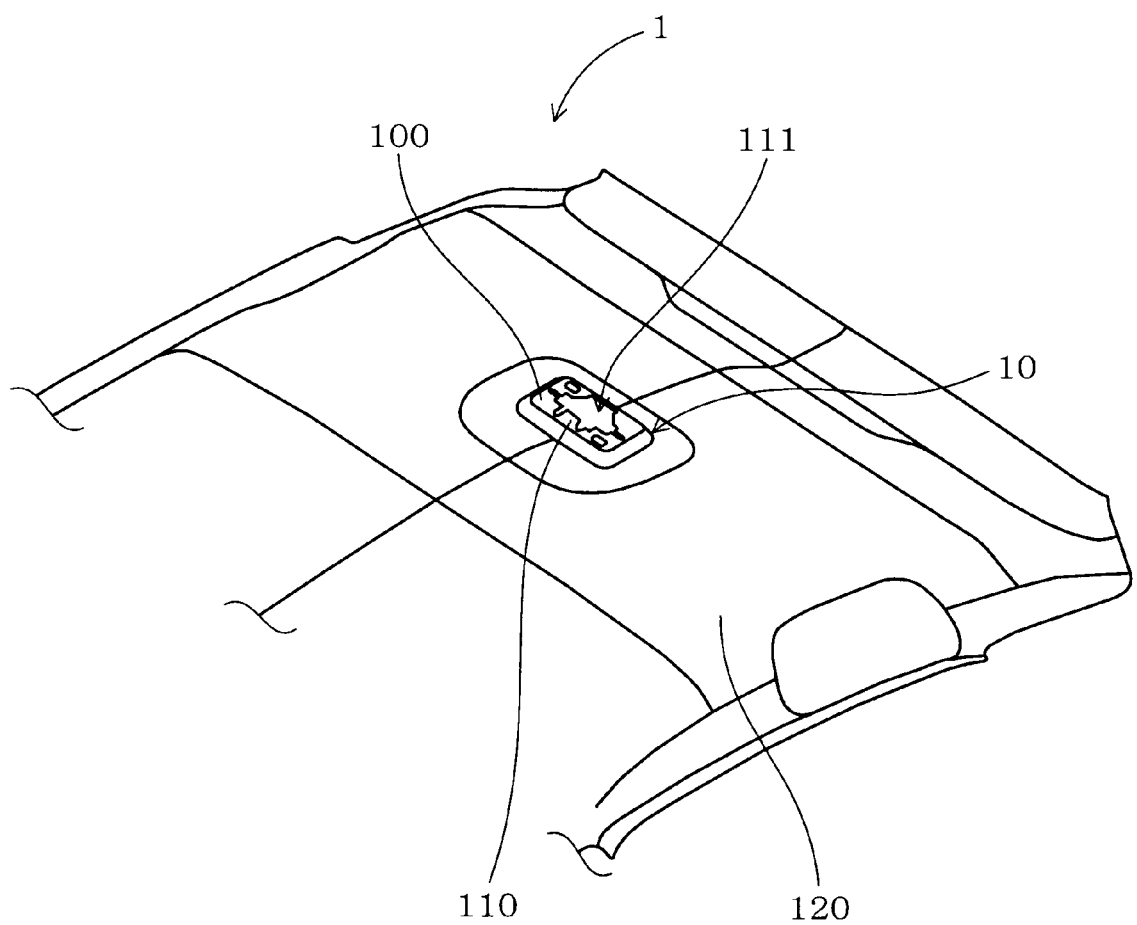
FIG. 5 is a perspective view of the ceiling decorative panel before raising a grip in the embodiment.
Figure 6:
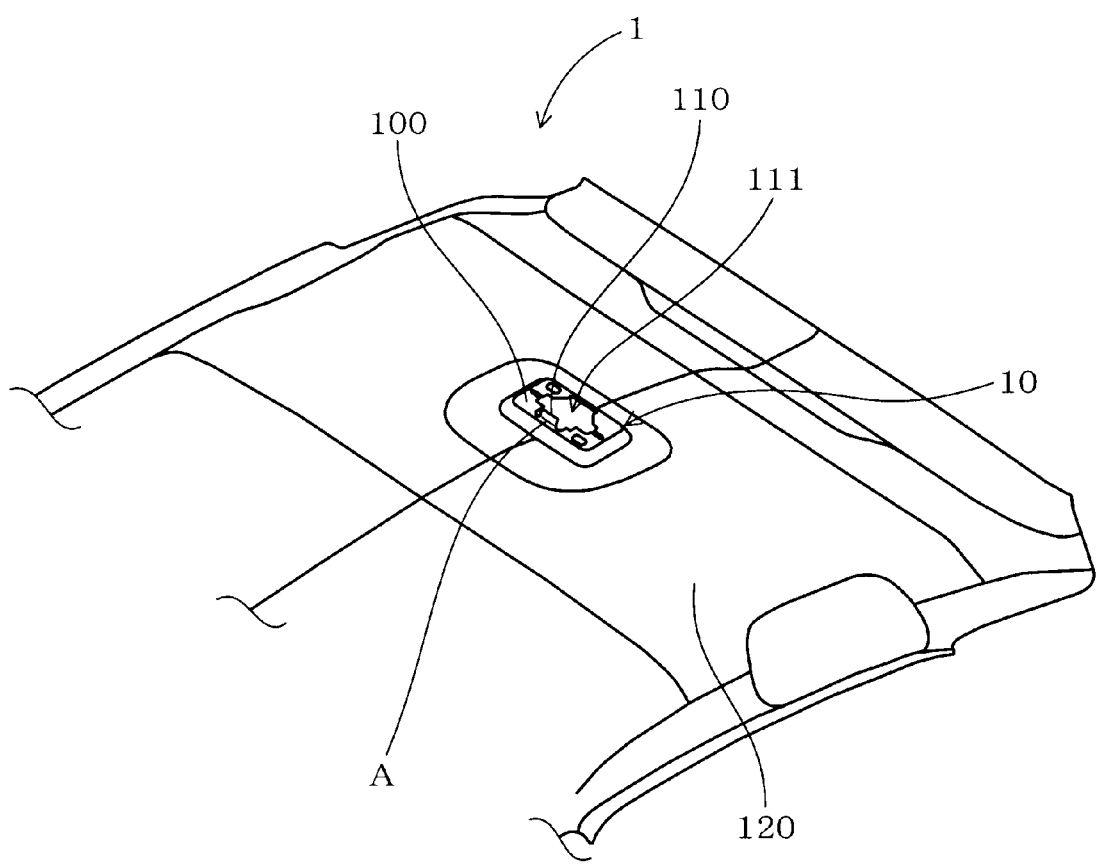
FIG. 6 is a perspective view of the ceiling decorative panel after raising the grip in the embodiment.

The ceiling decorative panel 1 in the embodiment is to be disposed on an inside of a roof panel 30 of a vehicle body 3 as shown in FIG. 4 (see an arrow Z in FIG. 4).

The ceiling decorative panel 1 has, as shown in FIGS. 1 to 3 and 7, a recessed portion 10 protruding toward a back face 120 side at a middle portion of the ceiling decorative panel 1 and having an opening portion 111 in a bottom face 100. The middle portion refers to the portion of the ceiling decorative panel 1 excluding longitudinal end portions.

Figure 1:
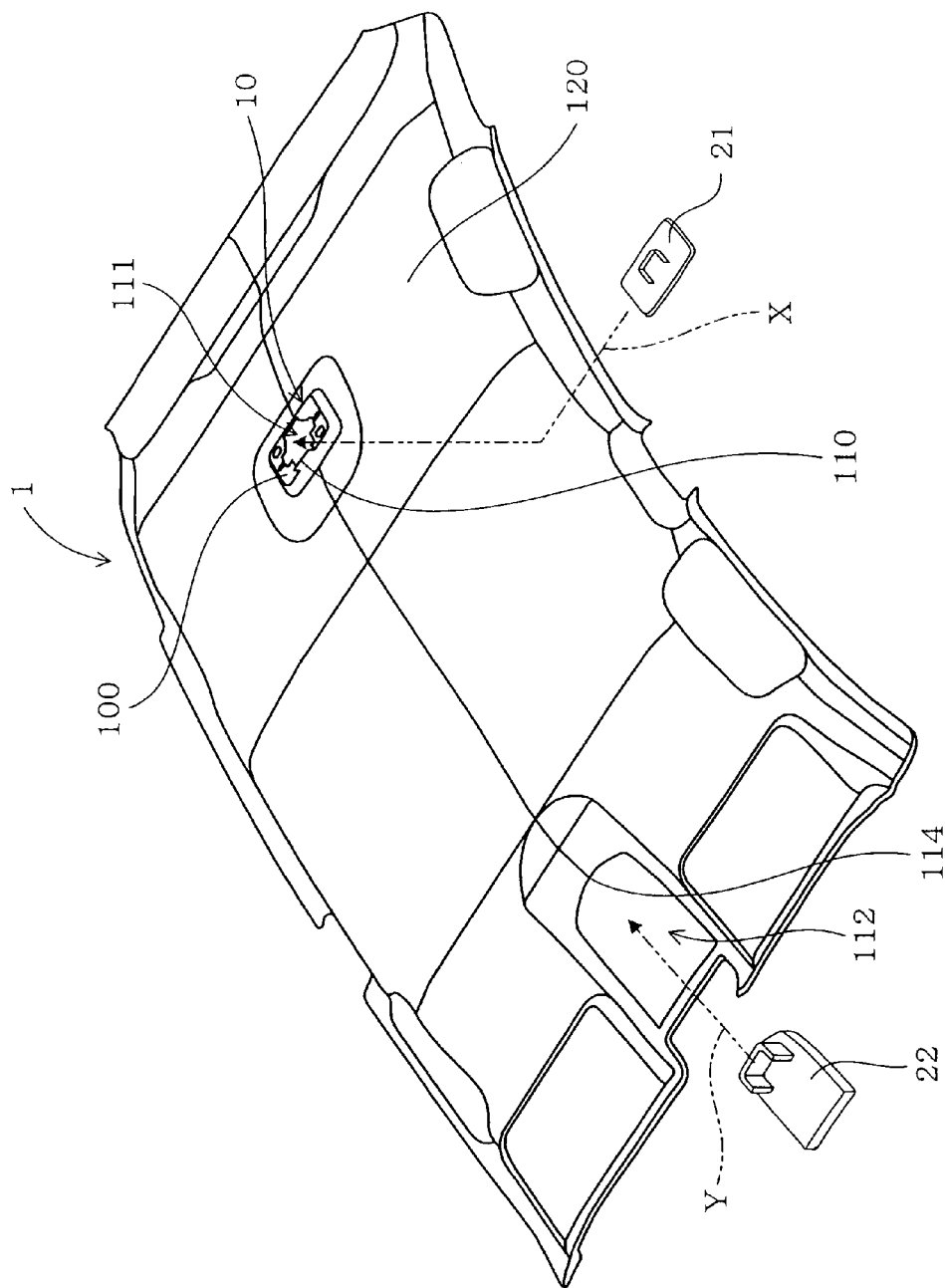
FIG. 1 is a perspective view of a ceiling decorative panel in an embodiment.
Figure 7:
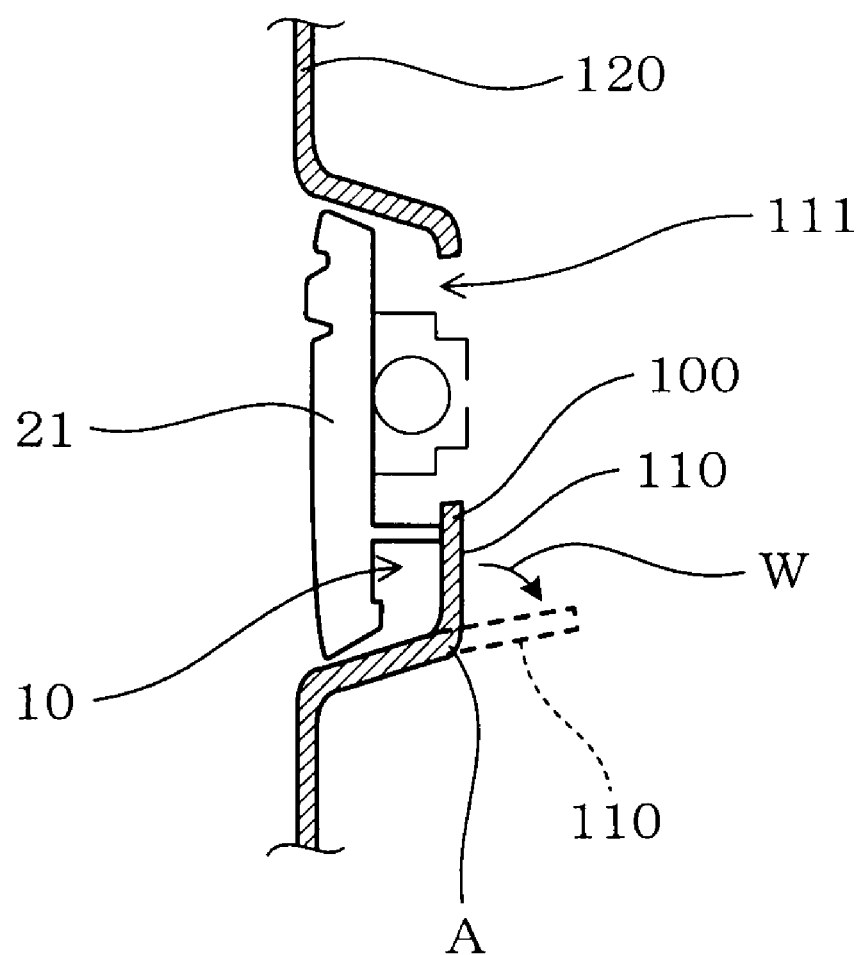
FIG. 7 is a sectional view of the recessed portion in the embodiment.

Inside the recessed portion 10, a dome lamp 21 is retained as shown in FIGS. 1, 4, and 7 (see an arrow X in FIGS. 1 and 4).

Figure 3:
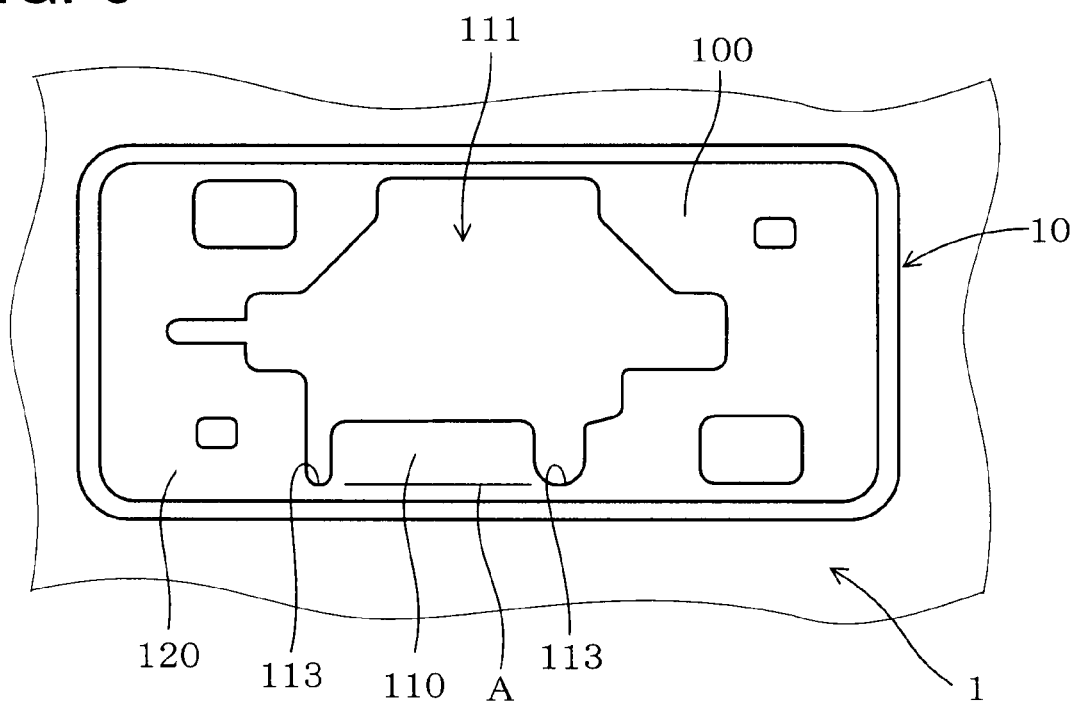
FIG. 3 is a plan view of the recessed portion in the embodiment.

As shown in FIGS. 1 and 3, a grip 110 that can be raised in a direction same as a protruding direction of the recessed portion 10 so as to be gripped by a hand is formed to be adjacent to the opening portion 111.

In the following description, above, left, and right refer to above, left, and right sides of the vehicle body 3 for convenience of explanation.

Detailed description will be provided below.

The ceiling decorative panel 1 is provided to the inside of the roof panel 30 of the vehicle body 3 of a passenger vehicle to decorate a ceiling face of a vehicle interior.

As the ceiling decorative panel 1 in the embodiment, press-formed urethane may be used, for example.

As the ceiling decorative panel 1, a panel that is about 1500 to 2500 mm long, about 1000 to 1400 mm wide, and about 3 to 10 mm thick may be used, for example.

The ceiling decorative panel 1 is formed into a curved face so that the whole of its sectional shape along a longitudinal direction is a convex protruding upward as shown in FIGS. 1 and 4.

As shown in FIGS. 1 and 4, the opening portion 111 (hereafter referred to as a dome lamp opening portion 111 for convenience of explanation) for disposing the dome lamp 21 is formed between a driver's seat and a backseat.

In other words, at a portion of the ceiling decorative panel 1 between the driver's seat and the backseat, the recessed portion 10 protruding upward is formed. As shown in FIG. 7, the dome lamp opening portion 111 is formed in the bottom face 100 of the recessed portion 10.

On the front side of the dome lamp opening portion 111, the grip 110 that can be raised upward and gripped by a hand is formed to be adjacent to the opening portion 111.

Figure 2:
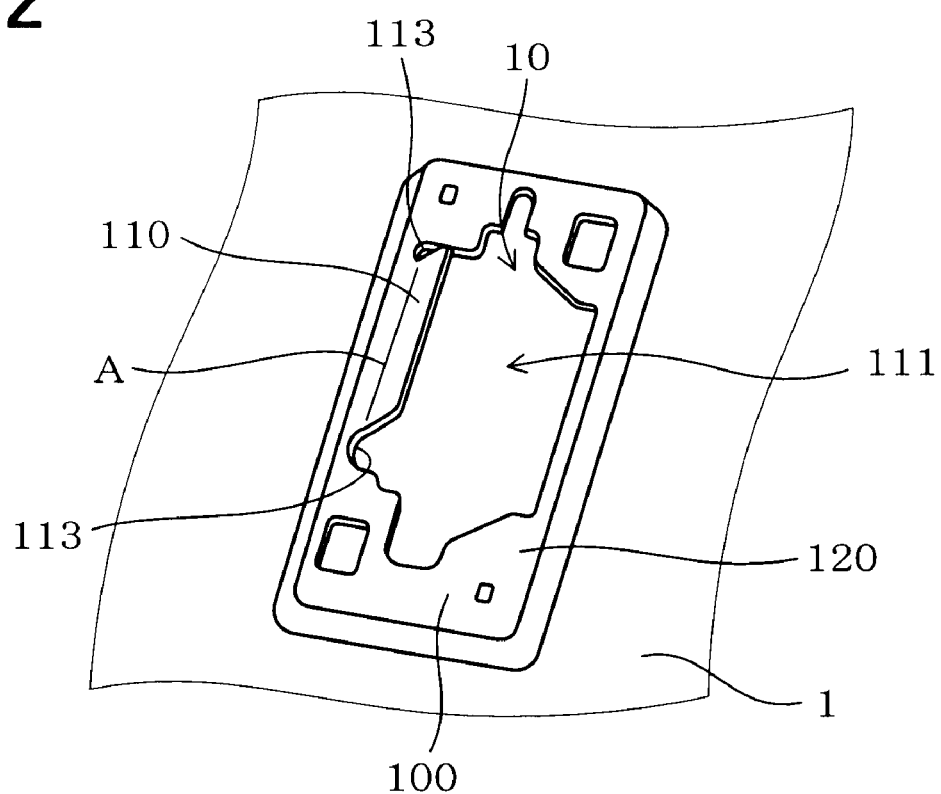
FIG. 2 is a perspective view of a recessed portion in the embodiment.

The grip 110 is formed by forming notches from the dome lamp opening portion 111 as shown in FIGS. 2 and 3.

More specifically, as shown in FIGS. 2 and 3, a pair of notch portions 113 parallel to the longitudinal direction of the ceiling decorative panel 1 and cut forward from the dome lamp opening portion 111 is formed. Between the pair of notch portions 113, the grip 110 is formed.

A shape of the grip 110 is not limited to the one mentioned above but may be various shapes.

On the other hand, as shown in FIGS. 1 and 4, a map lamp opening portion 112 larger than the dome lamp opening portion 111 is formed between the driver's seat and a passenger's seat of the front side of the ceiling decorative panel 1.

In the map lamp opening portion 112, a map lamp 22 is disposed (see an arrow Y in FIGS. 1 and 4).

Operation and effects of the embodiment will be described below as well as a manufacturing process and a method of carrying of the ceiling decorative panel 1.

First, the ceiling decorative panel 1 is formed. At this time, the pair of notch portions 113 is formed simultaneously with the dome lamp opening portion 111 in the ceiling decorative panel 1. Between the notch portions 113, the grip 110 is formed.

Alternatively, the grip 110 may not be formed at the time when the ceiling decorative panel 1 is formed. In this case, after forming the dome lamp opening portion 111, it is possible to form the grip 110 between the notch portions 113 by notching a front end edge of the dome lamp opening portion 111 toward the front of the ceiling decorative panel 1.

As described above, the grip 110 may be formed by various methods. When it is formed, the grip 110 is parallel to the bottom face 100, i.e., in a lying state.

Then, as shown by the arrow X in FIGS. 1 and 4, the dome lamp 21 is disposed inside the recessed portion 10 in the ceiling decorative panel 1.

Figure 8:
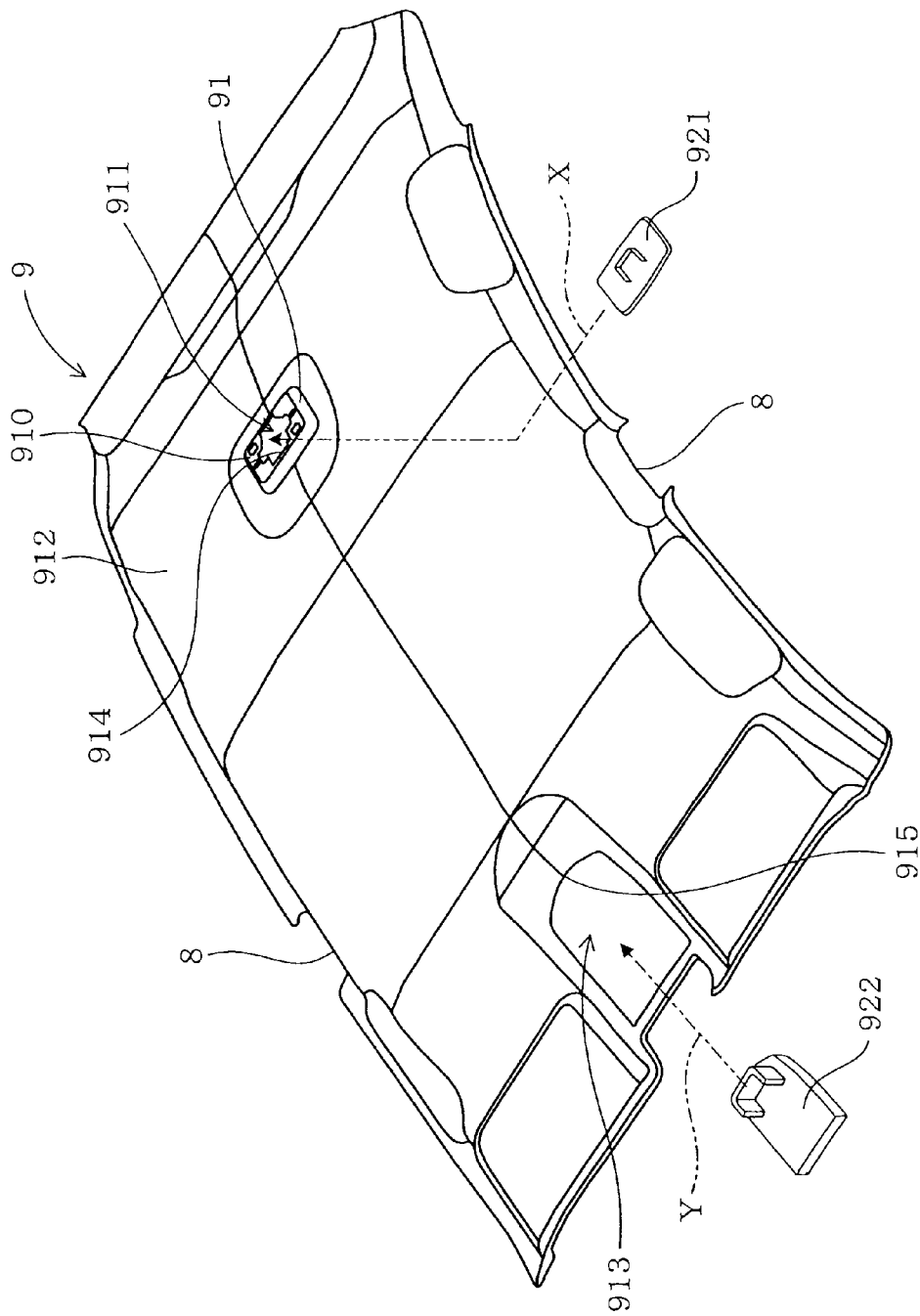
FIG. 8 is a perspective view of a prior-art ceiling decorative panel.

Here, if the dome lamp 21 is disposed in the recessed portion 10, the dome lamp opening portion 111 is closed and it becomes impossible to insert a hand into the dome lamp opening portion 111. Therefore, it is impossible to grip the front end edge (see a reference numeral 914 in FIG. 8) of the dome lamp opening portion 111.

Therefore, in the embodiment, the grip 110 is raised in the direction same as the protruding direction of the recessed portion 10. More specifically, the grip 110 in the above-described lying state is folded at a portion A shown in FIGS. 2, 3, 6, and 7 in the protruding direction. The grip 110 shown in a broken line in FIG. 7 is the grip 110 after being raised (see an arrow W in FIG. 7) in the direction same as the protruding direction of the recessed portion 10.

In this way, unlike the prior art (see FIG. 8), a worker can grip the grip 110 instead of the front end edge (see the reference numeral 914 in FIG. 8) of the dome lamp opening portion 111.

Then, as shown in FIGS. 1 and 4, the worker grips two portions, i.e., a rear end edge 114 of the map lamp opening portion 112 and the grip 110 of the dome lamp opening portion 111 with his/her left and right hands, respectively.

As a result, the worker can carry the ceiling decorative panel 1 to a line side of an assembly line while gripping the two portions.

In other words, in the above manner, it is possible to stably carry the ceiling decorative panel 1, even if the dome lamp opening portion 111 is closed by assembling the dome lamp 21 in advance in the recessed portion 10.

Even in a case where the map lamp opening portion 112 is not formed on the front side of the ceiling decorative panel 1 unlike the embodiment, the worker can carry the ceiling decorative panel 1 by gripping a front end edge of the ceiling decorative panel 1 and the grip 110, and the object of the present invention is achieved sufficiently.

The grip 110 is formed by notching the bottom face 100 from the dome lamp opening portion 111. Therefore, it is possible to easily form the grip 110 with a simple structure.

As described above, according to the embodiment, it is possible to provide the ceiling decorative panel in which grip can be secured easily and which can be carried stably even if the dome lamp is mounted in advance into the opening portion.

Obviously, numerous modifications and variations of the present invention are possible in light of the above teachings. It is therefore to be understood that, within the scope of the appended claims, the invention may be practiced otherwise than as specifically described here.

What is claimed is:

1. A ceiling decorative panel to be provided to an inside of a roof panel of a vehicle body, the ceiling decorative panel comprising:

a recessed portion that includes a plurality of side walls that protrude toward a back face side of the ceiling decorative panel, the back face side of the ceiling decorative panel being positioned adjacent to the roof panel of the vehicle body, the recessed portion having an opening portion at a bottom face, the recessed portion configured to retain a dome lamp therein; and a grip disposed adjacent to the opening portion, wherein the grip is configured to be raised in a same direction as a protruding direction of the recessed portion in a direction towards the roof panel of the vehicle body wherein the grip is formed along a longitudinal direction of one of the side walls of the recessed portion, and wherein prior to being raised, the grip is formed at an angle with respect to the one side wall, and after being raised, the grip is substantially coplanar with the one side wall.

2. A ceiling decorative panel according to claim 1, wherein the grip is formed by notching the bottom face from the opening portion.

3. A ceiling decorative panel according to claim 1, wherein prior to being raised in the protruding direction, the grip is substantially coplanar with a bottom surface of the recessed portion.

4. A ceiling decorative panel according to claim 1, wherein the entire grip extends along a longitudinal direction of the opening portion of the recessed portion.

5. A ceiling decorative panel according to claim 1, wherein the grip extends along only a portion of a longitudinal length of the opening portion of the recessed portion.

6. A ceiling decorative panel according to claim 5, wherein the grip extends along an approximate middle portion of the longitudinal length of the opening portion.

7. A ceiling decorative panel according to claim 1, wherein at least prior to being raised, the grip extends over a portion of the opening.

8. The ceiling decorative panel according to claim 1, wherein, when the grip is raised in the protruding direction of the recessed portion, the grip extends closer to the roof panel than a remainder of the recessed portion.

* * * * *